United States Patent [19]

Gerber et al.

[11] 4,082,972

[45] Apr. 4, 1978

[54] SMALL SYNCHRONOUS ELECTRIC MOTOR

[75] Inventors: Hermann Gerber, Courgevaux; Michel Johner, Kerzers, both of Switzerland

[73] Assignee: Ebauches SA, Neuchatel, Switzerland

[21] Appl. No.: 598,148

[22] Filed: Jul. 23, 1975

Related U.S. Application Data

[63] Continuation of Ser. No. 356,309, May 2, 1973, abandoned.

[51] Int. Cl.² .................................. H02K 19/00
[52] U.S. Cl. ................................. 310/162; 310/42; 310/89; 310/258
[58] Field of Search ............ 310/162, 254, 163, 258, 310/164, 259, 49, 156, 40 MM, 89, 90, 42, 43

[56] References Cited

U.S. PATENT DOCUMENTS

| | | | |
|---|---|---|---|
| 2,951,957 | 9/1960 | Eigeman | 310/164 |
| 2,981,855 | 4/1961 | Van Lieshout | 310/162 |
| 3,414,751 | 12/1968 | Bossard | 310/164 |
| 3,495,113 | 2/1970 | Haydon | 310/164 |
| 3,525,888 | 8/1970 | Linn | 310/162 |
| 3,535,571 | 10/1970 | Heinzen | 310/164 |
| 3,555,323 | 1/1971 | Gerber | 310/164 |
| 3,633,055 | 1/1972 | Maier | 310/156 |
| 3,676,725 | 7/1972 | Wiser | 310/162 |
| 3,711,732 | 1/1973 | Gerber | 310/162 |
| 3,737,695 | 6/1973 | Kilmer | 310/162 |

*Primary Examiner*—R. Skudy
*Attorney, Agent, or Firm*—Imirie, Smiley & Guay

[57] ABSTRACT

An electric motor, particularly a small synchronous motor, which includes a stator made in two identical portions designed to be joined face-to-face, each portion stamped from sheet metal to form a number of pole teeth as well as members for interconnecting the stator portions and for providing a magnetic return path.

5 Claims, 6 Drawing Figures

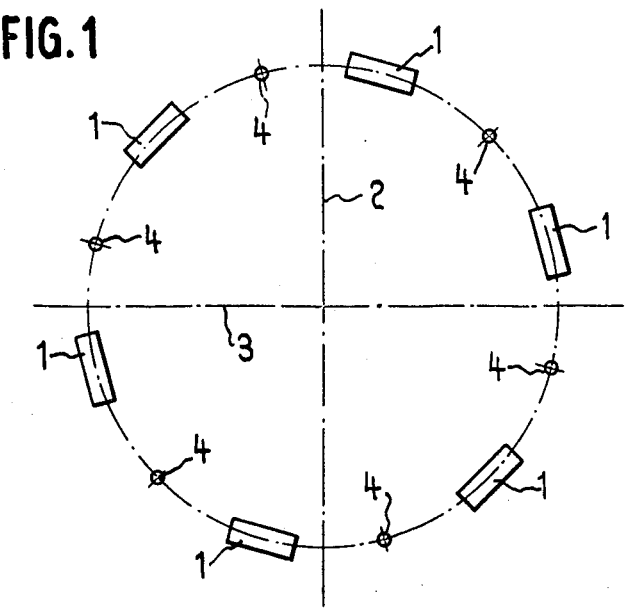
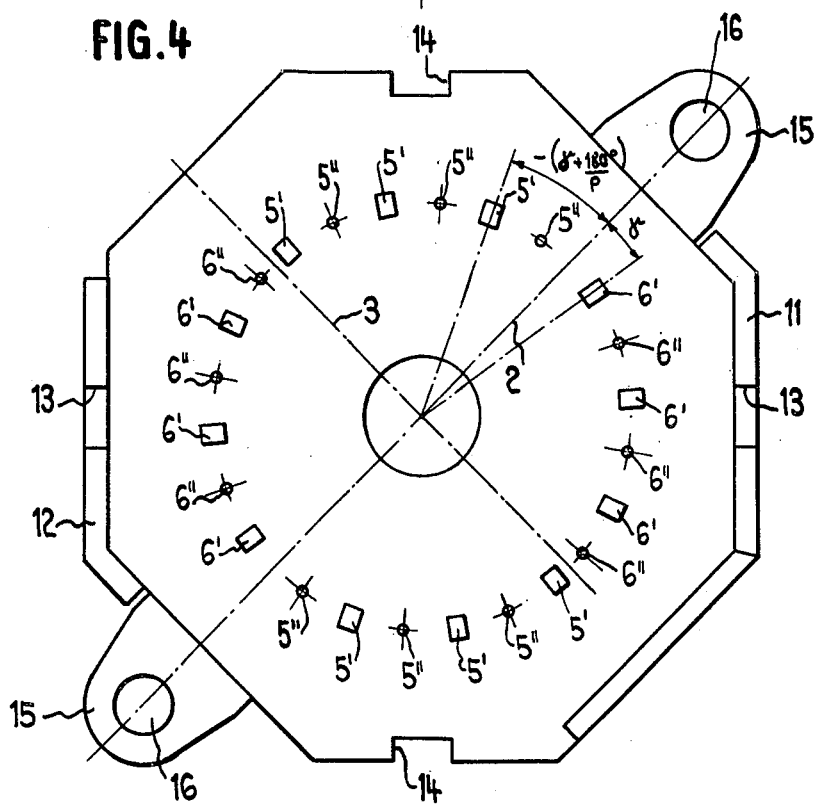

SMALL SYNCHRONOUS ELECTRIC MOTOR

This is a continuation of application Ser. No. 356,309, filed May 2, 1973, now abandoned.

BACKGROUND OF THE INVENTION

This invention relates to an electric motor, particularly a small synchronous motor, having two stator portions of which pole teeth axially interengage within reach of the rotor. Prior motors of this kind usually have two different stator portions of which the one is usually cup-shaped and is riveted along its rim to the other stator portion which is flat except for its pole teeth. The prior forms of stator portions require two different cutting and stamping tools of which at least the one for cupping the cup-shaped stator part is complicated and expensive.

SUMMARY OF THE INVENTION

It is an object of this invention to provide a motor which may be manufactured much simpler and cheaper. The motor according to this invention is characterized in that the stator including its magnetic return path between poles of opposite polarity is made of two portions or unitary pieces only which are identical as to their positioning means, to their means for connecting them to each other and to the disposition of poles thereon.

It is another object of this invention to provide clear rules according to which identical stator portions for various types of motors may be designed without any mechanical or electrical disadvantages over conventional motors.

It is an other object of this invention to allow manufacture of the stator by means of less and simpler tools, whereby no cupping operations are required, this allowing the use of preprocessed sheet steel, that is, of sheet steel having relatively bad mechanical properties but excellent magnetic properties, for instance silizium steel.

The fact of using identical stator halves facilitates the inspection and a uniform quality in series production.

It is a further object of this invention to provide stators made of identical halves for motors with or without auxiliary shaded poles, for synchronous motors asynchronous motors, multiphase motors or collector motors, wherein groups of main and auxiliary poles may be provided for determining the starting direction.

This invention will now be explained with reference to embodiments of the novel motor, illustrated by way of example in the accompanying drawings.

BRIEF DESCRIPTION OF THE DRAWINGS

FIG. 1 is a schematic example of a pole disposition for a motor having no auxiliary poles, FIG. 4 shows a modified embodiment of the stator portion with a schematic illustration of the disposition of poles when providing two groups of main and auxiliary poles.

DESCRIPTION OF THE PREFERRED EMBODIMENT

Figure 2:
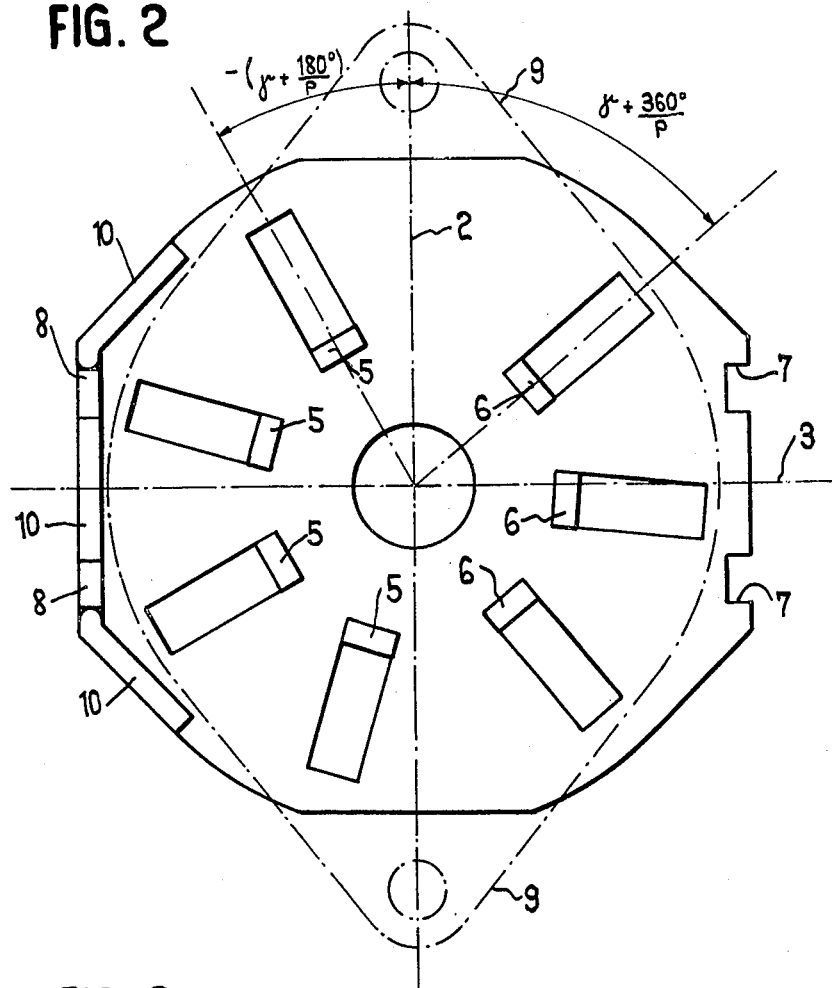
FIG. 2 illustrates a stator portion in front elevation with a coil carrier indicated in dash-dotted lines.

FIG. 1 schematically shows the disposition of stator poles in a motor having no auxiliary poles. Therefore, north poles and south poles are uniformly distributed along the circumference. The one stator pole has poles 1 indicated in FIG. 1 by rectangles. In order that the remaining poles may be disposed on an identical stator portion the poles 1 must be disposed in each stator portion in a predetermined position relatively to an inverting axis 2 and relatively to an axis or inverting direction 3 perpendicular to the inverting axis. Assuming that all stator poles 1 are inverted with respect to axis 2 into a symmetrically opposite position or mirror position such inverted poles should fall symmetrically between existing poles on the other side, because the two stator parts are assembled in opposite position with the pole teeth facing and overlapping each other, whereby the assembling means will usually be disposed symmetrically to the axis 3. The above conditions are met with if the poles 1 are spaced from one point of the inverting axis 2 by an angular distance of $90 + n \cdot 360$ or $270 + n \cdot 360$ electrical degrees. Generally the geometrical distance of the poles from one point of the inverting axis is $\pm 90° + n \cdot 360°/p$, wherein $n = 0,1,2,3,\ldots$ and $p$ is the number of pole pairs. As shown in FIG. 1 by circles 4 the poles of the inverted stator portion are symmetrically disposed between the poles 1. The correct mutual angular position of the stator portions may be determined by suitable positioning means, for instance by the fixing means for assembling the stator portions.

Figure 3:
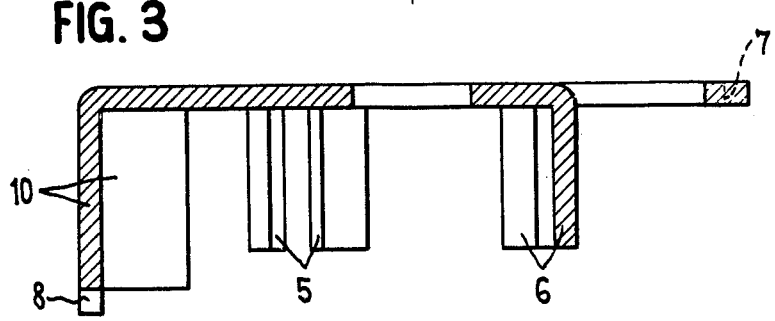
FIG. 3 is a section of the stator portion shown in FIG. 2.

FIGS. 2 and 3 show a practical embodiment of a motor having auxiliary poles. Each stator portion, of which one is shown in FIGS. 2 and 3, has a group of four poles 5 acting as auxiliary poles in the illustrated motor and which are shaded by a short-circuiting disc not shown in the drawing. These poles are cut and bent as usual from the stator sheet metal. The stator portion has notches 7 at one side, adapted to receive connecting teeth 8 of the other stator part provided at the other side of the stator portion. FIG. 2 indicates a coil carrier in dash-dotted lines, this coil carrier being inserted between the stator parts and having eyes 9 for fixing the motor. The teeth 8 are fixed on lugs 10 laterally covering and closing the coil space.

The poles 6 forming in this embodiment main poles shall be shifted relatively to poles 5 by an angle $\beta$ determined by the phase shift $\phi$ of the auxiliary flux relatively to the main flux. In small synchronous motors as illustrated in FIGS. 2 and 3 this angle is in the order of 130 to 140 electrical degrees. Therefore, the groups of poles 5 and 6 must not be disposed symmetrically opposite each other with regard to the inverting axis 2, but they have to be additionally shifted. In other words, the middle pole 6 cannot be disposed symmetrically with respect to axis 3 and the two inner poles 5 cannot be disposed symmetrically with respect to axis 3. However, when such a symmetrical arrangement is first assumed as being provided, it is seen that the poles of each group will correctly interengage when the identical stator parts are assembled if each of the groups is shifted from the symmetrical position in opposite direction by an angle $\gamma$.

From this rule the position of the inverting axis 2 and of the inverting direction 3 respectively with respect to the groups of main poles and auxiliary poles may be determined. The poles of the one group, for instance of the group of main poles have to be shifted from one point of the inverting axis 2 by the angle $$\pm (\gamma + n \cdot 360°/p) \text{ (geometrical degrees)}$$

while the poles of the other group (for instance of the auxiliary poles) have to be shifted by an angle of $$\mp (\gamma + 180° + n \cdot 360°/p) \text{ (geometrical degrees)}.$$

In these formulas $p$ is the number of pole pairs of the stator fully equipped with poles and $n = 0,1,2,3,\ldots$ The angle $\gamma$ may be chosen as desired within the geometrically and mechanically possible limits in order to adapt the pole shifting to the electrical requirements. A full electrical pole shifting corresponding to the angle $\beta = 180° - \phi$ may be obtained, wherein $\phi$ is the phase shift of the auxiliary field relatively to the main field. The following conditions result from the above relations:

$$\gamma = \frac{180° - \beta}{2p} = \frac{90° - \frac{1}{2}\beta}{p}$$

$$\gamma + \frac{360° \cdot n}{p} = \frac{180° - \beta}{2p} + \frac{360° \cdot n}{p} = \frac{90° - \frac{1}{2}\beta + 360° \cdot n}{p}$$

$$\gamma + \frac{180°}{p} + \frac{360° \cdot n}{p} = \frac{180° - \beta}{2p} + \frac{180°}{p} + \frac{360° \cdot n}{p} = \frac{270° - \frac{1}{2}\beta \; 360°}{p}$$

Associated assembling means 7 and 8 of the stator portions should be disposed symmetrically to the inverting axis 2 or in this axis.

The same rules apply for motors having two groups of main poles and of auxiliary poles. Since such rules are valid for adjacent groups of main poles and auxiliary poles as shown above for two groups of poles they must also be valid for each pair of adjacent pole groups if more than one pair of pole groups are provided. Once the position of the poles of two adjacent groups of poles are determined, the remaining poles in the other quadrants may be determined from the inverting axis with opposite sign. With usual stators having an even number of poles $Z = n \cdot 2p$, diagonal lines may be drawn from the pole positions determined first in two adjacent quadrants in order to find the positions of the poles in the remaining quadrants.

FIG. 4 schematically shows an embodiment having two groups of main poles and of auxiliary poles.

The stator portion is similar to the one shown in FIGS. 2 and 3. Bent lugs 11 and 12 forming the mantle of the casing and the magnetic return path when two stator portions are assembled, are provided with teeth 13 engaging into notches 14 and are riveted therein when the stator portions are assembled. Each stator portion has fixing angles 15 bent inwardly from the plane of the stator sheet steel. Such angles 15 overlay each other with the fixing holes 16 covering each other when two stator portions are assembled.

In FIG. 4 the poles of the illustrated stator portion are schematically shown as rectangles while the poles of the other stator portion which would be in an inverted position with regard to the inverting axis 2 are indicated by circles. It is assumed by way of example that the poles 5' are main poles and the poles 6' are auxiliary poles. Then the poles 5" and 6" are main poles and auxiliary poles respectively although the poles 5" result from an inversion of poles 6'.

The poles are disposed with respect to the inverting axis 2 in accordance with the above rules. The distance of adjacent pole 6' from the upper portion of the inverting axis 2 is 10° while the distance of the adjacent pole 5' is 25°. At the diametrically opposite boundary between main poles and auxiliary poles the disposition is symmetrical. The angle $\gamma$ equals 10° and corresponds to an electrical angle of 120°.

In practice, that is, when considering the real phase shifting of the flux in small synchronous motors, this angle is usually appreciably smaller. As an example, if $\beta = 120°$, $$\gamma = 180° - \beta/2 \, p = 60°/24 = 2,5°.$$

However, in order to obtain a clear illustration in FIG. 4 a substantially greater angle has been chosen. Further, in practice a pole at a distance of $\gamma$ from the inverting axis will usually be impossible from a geometrical and mechanical point of view, because it would be too near to the symmetrically disposed pole of the other stator portion. Under these circumstances the poles adjacent the inverting axis will then have a distance of $\pm (\gamma + 360°/p)$ or $\mp (\gamma + 180°/p)$ respectively from the same.

Many modifications of the embodiments as described above are feasible. As an example, the fixing angles 15 shown in FIG. 4 may be used for assembling the stator portions. Both illustrated embodiments have interengaging assembling means determining the mutual angular position of the stator portions. However, axially symmetrical stator portions may be used which are assembled by means which do not determine the relative angular position of the stator portions. In such a case, reference marks or guide means may be used for assisting proper assemblage of the stator portions, for instance a coil carrier having guiding grooves receiving the pole teeth of the stator portions.

In the embodiment of FIG. 4 both groups of auxiliary poles are provided with short-circuiting rings for phase-shifting the flux therein. However, it may be possible to provide short-circuiting rings or discs on one stator portion only.

When the motor has only one rotor bearing it may be a disadvantage to provide means for fixing a rotor bearing on both stator portions but to apply a rotor bearing to one stator portion only. In this case the rotor bearing may preferably be fixed to or be made in one piece with the coil carrier.

With stator portions as shown in FIGS. 2 and 4 the outer angled portions of the assembling lugs 10 and 11 respectively may be omitted in order to further simplify manufacture.

The assembling lugs 10 and 11 serving as magnetic return paths may preferably be disposed each within reach of a group of main poles and within reach of a group of auxiliary poles respectively, in order that main flux only or auxiliary flux only flows in each of such magnetic return paths.

Figure 5:
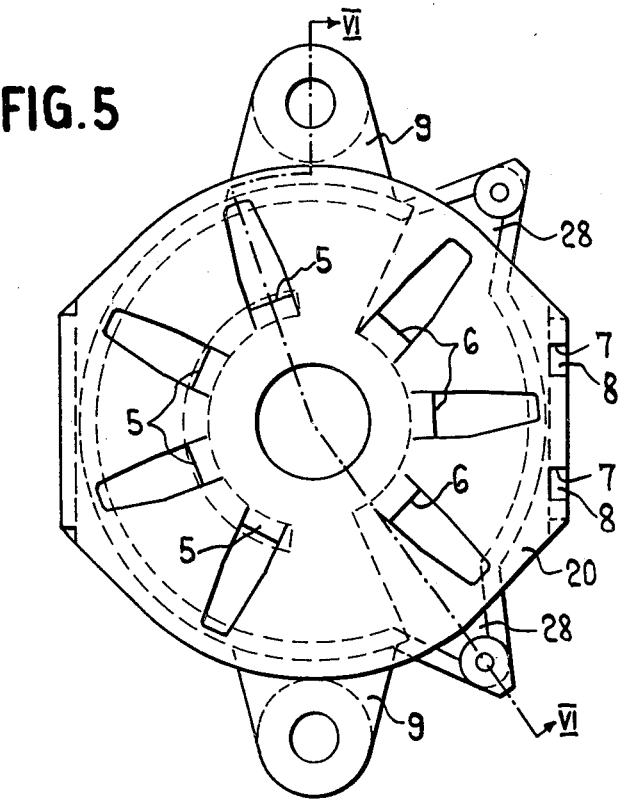
FIGS. 5 and 6 show an embodiment of the motor in elevation and in section along line VI—VI of FIG. 5 respectively.
Figure 6:
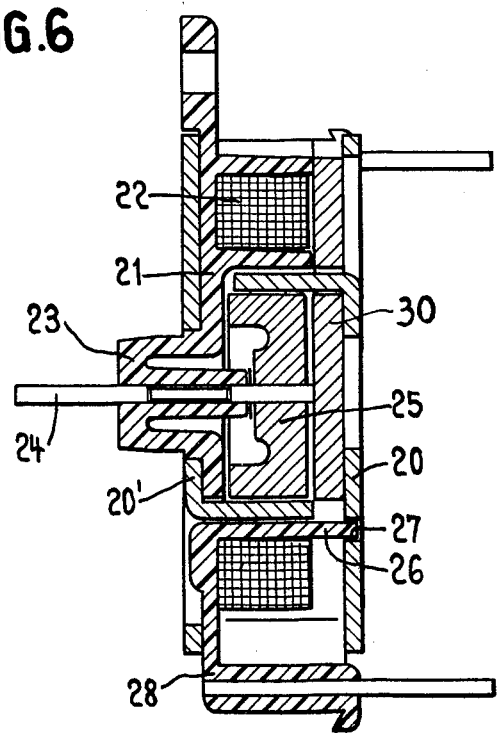

The motor shown in FIGS. 5 and 6 has identical stator portions 20 and 20' substantially as shown in FIGS. 2 and 3, with pole teeth 5 and 6, but without lugs 10. These stator portions are assembled by means of interengaging teeth 8 and grooves 7. A coil carrier 21 of plastic material carrying the annular coil 22 is made in one piece with a single bearing portion 23 for the shaft 24 of a rotor 25. The coil portion also has outwardly extending fixing lugs or eyes 9. Axial projections 26 of the coil carrier engage apertures 27 of each of the stator portions 20 and 20' respectively, whereby the mutual positioning of the stator portions and coil carrier is warranted. The coil carrier has projecting terminal carriers 28 carrying the motor terminals 29 connected to the coil 22. A short-circuiting disc 30 shading the auxiliary poles on the left side of the motor (FIG. 5) is only provided in the one stator portion 20, this being clearly shown in FIG. 6.

What we claim is:

1. A small synchronous electric motor, comprising:
   (a) a stator casing formed by a pair of opposed identical stator casing pieces having magnetic properties
   (b) each stator casing piece being a sheet metal stamping having a flat substantially circular central portion, and each piece being positioned with respect to each other so that the central portions are disposed in parallel spaced relation and form the outer casing surface
   (c) a coil carrier assembly disposed within and supported by the stator casing and including an annular coil
   (d) a rotor disposed within the annular coil of the coil carrier assembly and having a shaft which extends axially and outwardly through the stator casing
   (e) first and second groups of poles extending from the central portion of each stator casing piece which occupy opposed sectors along a circle having a center which coincides with the shaft of the rotor and a diameter such that the poles are disposed adjacent the annular coil
   (f) the length and width of the poles and their spacing being such as to permit interleaving of the first and second group of poles of one stator casing piece with the second and first group of poles respectively of the second stator casing piece
   (g) an inverting axis passing through the circle center between each sector and having a fixed angular relation at one end with respect to the nearest pole of each group of poles
   (h) an axis of symmetry passing through the circle center perpendicular to the inverting axis
   (i) an assembly lug section on each stator casing piece within the sector of one group of poles extending axially to the central portion and symmetrically disposed to the axis of symmetry
   (j) assembly lug section receiving means disposed on the central portion within the sector of the other group of poles diametrically opposite and in alignment with the assembly lug section for receiving and supporting the assembly lug sections
   (k) the assembly lug section and the assembly lug receiving means when joined providing a magnetic return path between interleaved groups of poles on opposite stator casing pieces
   (l) the length, shape and position of the lug assembly section and the assembly lug section receiving means being such as to provide accurate spacing between the plates as well as positioning such that the poles of both elements are readily positioned in both the axial and circumferential directions.

2. The electric motor as set forth in claim 1, wherein:
   (a) the poles are angularly spaced from the inverting axis sequentially from the intersection of the inverting axis and the circle according to the formula $$\pm 90° + n \cdot 360°/p \text{ (geometrical degrees)}$$

wherein $n = 0,1,2,\ldots$ and $p$ is the number of pole pairs.

3. The electric motor as set forth in claim 1, wherein:
   (a) one of the groups of poles are main poles, and the other group of poles are auxiliary poles.

4. The electric motor as set forth in claim 3, wherein:
   (a) the main group of poles are angularly spaced from the inverting axis in a direction sequentially from one intersection of the inverting axis and the circle according to the formula $$\pm(90° - \tfrac{1}{2}\beta + n \cdot 360°/p) \text{ (geometrical degrees)}$$

and
   (b) the auxiliary group of poles are angularly spaced from the inverting axis in the opposite direction sequentially from the intersection of the inverting axis and the circle according to the formula $$\mp(270° - \tfrac{1}{2}\beta = n \cdot 360°/p) \text{ (geometrical degrees)}$$

wherein $p$ is the number of pole pairs, $\beta$ is phase shifting angle between the main poles and the auxiliary poles and $n = 0,1,1,\ldots$ 5. The electric motor as set forth in claim 1, wherein:
   (a) the coil carrier is made of plastic material and extends axially between the opposed central portions of the stator casing pieces
   (b) a part of the coil carrier extending upwardly into openings in the central portions to hold the coil carrier in fixed position with respect to the stator casing pieces
   (c) outwardly projecting lugs on the coil carrier which extend beyond the periphery of the central portions for fastening the motor in position, and
   (d) terminal carrier sections on the coil carrier.

* * * * *

UNITED STATES PATENT AND TRADEMARK OFFICE
CERTIFICATE OF CORRECTION

PATENT NO. : 4,082,972
DATED : April 4, 1978
INVENTOR(S) : HERMANN GERBER ET AL

It is certified that error appears in the above-identified patent and that said Letters Patent are hereby corrected as shown below:

In the title page, change the name of the Assignee at item number 73 as follows:

[73] SAIA A.G.
 Murten, Switzerland

In Claim 4, line 12 change the formula to read as follows:

-- $\mp \dfrac{(270° - 1/2\beta + n \cdot 360°)}{p}$ --

Signed and Sealed this

Fifth Day of August 1980

[SEAL]

Attest:

Attesting Officer

SIDNEY A. DIAMOND
Commissioner of Patents and Trademarks